United States Patent
Deas

(10) Patent No.: US 8,107,488 B2
(45) Date of Patent: Jan. 31, 2012

(54) PASSIVE OPTICAL NETWORK AND ULTRAWIDE BAND ADAPTER

(75) Inventor: David A. Deas, Round Rock, TX (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 226 days.

(21) Appl. No.: 12/638,100

(22) Filed: Dec. 15, 2009

(65) Prior Publication Data

US 2010/0092170 A1 Apr. 15, 2010

Related U.S. Application Data

(63) Continuation of application No. 12/035,128, filed on Feb. 21, 2008, now Pat. No. 7,672,338, which is a continuation of application No. 10/810,488, filed on Mar. 26, 2004, now Pat. No. 7,366,203.

(51) Int. Cl.
*H04L 12/28* (2006.01)
*H04L 12/56* (2006.01)

(52) U.S. Cl. ........................................ 370/419
(58) Field of Classification Search .................... 370/419
See application file for complete search history.

(56) References Cited

U.S. PATENT DOCUMENTS

| | | | |
|---|---|---|---|
| 5,610,907 A | 3/1997 | Barrett | |
| 5,761,351 A | 6/1998 | Johnson | |
| 5,773,817 A | 6/1998 | Kingsley et al. | |
| 5,812,081 A | 9/1998 | Fullerton | |
| 6,160,802 A | 12/2000 | Barrett | |
| 6,492,904 B2 | 12/2002 | Richards | |
| 6,505,032 B1 | 1/2003 | McCorkle et al. | |
| 6,535,331 B2 | 3/2003 | Shiota et al. | |
| 6,549,587 B1 | 4/2003 | Li | |
| 6,643,417 B2 | 11/2003 | Strutz et al. | |
| 6,721,797 B1 | 4/2004 | Kim | |
| 6,735,238 B1 | 5/2004 | McCorkle | |
| 6,757,251 B1 | 6/2004 | Nakaishi | |
| 6,782,048 B2 | 8/2004 | Santhoff | |
| 7,099,443 B2 * | 8/2006 | Phillips et al. | 379/93.05 |
| 7,590,144 B1 * | 9/2009 | Ladd | 370/466 |
| 7,861,272 B2 * | 12/2010 | Russ et al. | 725/74 |
| 7,965,673 B2 * | 6/2011 | Iwamura | 370/328 |
| 2003/0138061 A1 | 7/2003 | Li | |

(Continued)

OTHER PUBLICATIONS

International Search Report for International Patent No. PCT/US2005/006073, mailed on Oct. 24, 2006. Copy provided in U.S. Appl. No. 12/035,128.

(Continued)

*Primary Examiner* — Ayaz Sheikh
*Assistant Examiner* — Blanche Wong
(74) *Attorney, Agent, or Firm* — Toler Law Group, PC

(57) ABSTRACT

A system includes a passive cable splitter and an ultra wideband adapter located at a customer premises. The passive cable splitter receives a video signal and a modulated ultra wideband data signal from a remotely-located ultra wideband adapter via a first cable. The video signal and the modulated ultra wideband data signal are output to a set-top box device via a second cable. The ultra wideband adapter located at the customer premises includes a combined signal interface to receive the video signal and the modulated ultra wideband data signal via a third cable. A demodulator extracts a data signal from the modulated ultra wideband data signal to generate a computer readable data signal. The computer readable data signal is output to a computing device via a data connection interface.

20 Claims, 2 Drawing Sheets

U.S. PATENT DOCUMENTS

| | | | |
|---|---|---|---|
| 2003/0235235 A1* | 12/2003 | Santhoff | 375/130 |
| 2003/0235236 A1 | 12/2003 | Santhoff | |
| 2004/0081402 A1 | 4/2004 | Ouchi | |
| 2004/0143428 A1 | 7/2004 | Rappaport et al. | |
| 2004/0187156 A1 | 9/2004 | Palm et al. | |
| 2004/0264974 A1 | 12/2004 | Sorenson | |

OTHER PUBLICATIONS

Written Opinion of the International Searching Authority for PCT/US2005/006073, mailed on Oct. 24, 2006. Copy provided in U.S. Appl. No. 12/035,128.

10-2006-7015581, Korean Notice of Preliminary Rejection mailed May 14, 2008 (3 pages). Copy provided in U.S. Appl. No. 12/035,128.

10-2006-7015581, Korean Notice of Preliminary Rejection mailed Nov. 20, 2007 (4 pages). Copy provided in U.S. Appl. No. 12/035,128.

GB0615070.0, Great Britain Examination Report dated Oct. 10, 2007 (3 pages). Copy provided in U.S. Appl. No. 12/035,128.

* cited by examiner

PASSIVE OPTICAL NETWORK AND ULTRAWIDE BAND ADAPTER

CLAIM OF PRIORITY

The present application is a continuation of and claims priority from U.S. patent application Ser. No. 12/035,128 filed on Feb. 21, 2008 (now U.S. Pat. No. 7,672,338), which is a continuation of U.S. patent application Ser. No. 10/810, 488 filed on Mar. 26, 2004 (now U.S. Pat. No. 7,366,203), the contents of which are expressly incorporated herein by reference in their entirety.

FIELD OF THE DISCLOSURE

The present disclosure relates generally to a system having a passive optical network and ultra wideband adapters.

BACKGROUND

Research efforts in ultrawide band (UWB) apparatus were initiated in military research laboratories in the United States and Europe in the 1950s-1960s. The military's primary interest was development of UWB technology as a means of "seeing" through trees and other obstructions that would not be possible utilizing conventional radar systems.

Ultrawide band uses very short duration pulses, in the billionths or trillionths of a second duration, which provides excellent range resolution at a lesser cost than conventional radars. Each pulse covers several gigahertz of radio spectrum, with information being transmitted by modulating the timing, amplitude, polarity, or other aspect of the pulses. The location of an object, to within centimeters, is inferred utilizing methods employed in conventional radars, e.g., echo return timing, target triangulation, and the like. This precise location technology has been demonstrated in automotive collision warning systems, through-wall sensing applications, soil-characterization, and industrial level measurement, amongst others.

Until recently, UWB was constrained by regulatory restrictions in the United States and abroad. However, with the relaxation of these regulations, and the inclusion of UWB into communication standards, interest from the private sector has expanded to transfer this technology into commercial production. One particular area where UWB commercialization may be viable is in the field of high-speed communications. While conventional UWB methods and systems may be suitable for military uses, such implementations do not yet meet the needs of commercial communications applications, including robust customer delivery, scalability, ease of maintenance, flexibility, and overall system and service operation.

DETAILED DESCRIPTION

Figure 1:
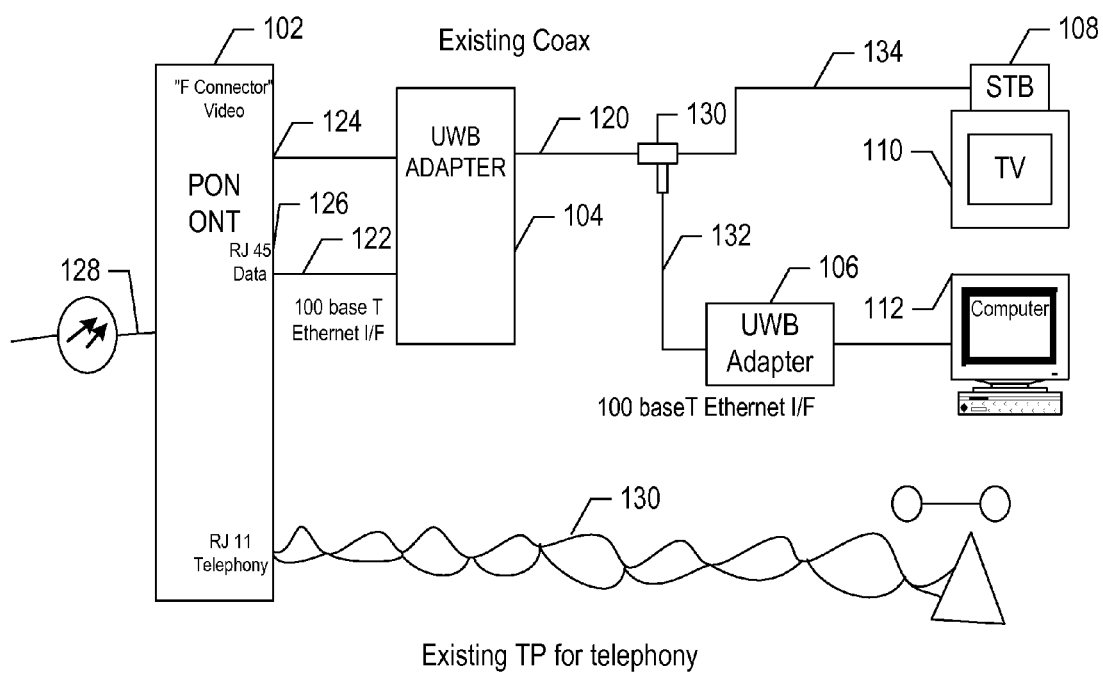
FIG. 1 is a block diagram of a system including ultra wideband adapters and a passive optical network (PON).

In a particular embodiment, the present disclosure is directed to a system including a passive optical network element and a first ultra wideband adapter coupled to the passive optical network element. The first ultra wideband adapter is coupled via a data communication line to a second ultra wideband adapter. The second ultra wideband adapter has a connection to an end user computing device.

In another particular embodiment, the system includes a passive optical network element having an input to receive an optical communication signal and having a video output, a data output, and a telephony output. The system includes a first ultra wideband adapter coupled to the passive optical network element. The first ultra wideband adapter has a first input coupled to the video output and a second input coupled to the data output. The first ultra wideband adapter has an ultra wideband data output coupled via a data communication line to a passive cable splitter element. The passive cable splitter element is connected to a first coaxial cable path and a second coaxial cable path. The system also includes a second ultra wideband adapter having an input coupled to the second coaxial cable path and having an output data connection configured to interface with a personal computer. In another embodiment, an ultra wideband adapter is disclosed that includes a first input coupled to a far end ultra wideband adapter via an intermediary coaxial cable communication line. The far end ultra wideband adapter is coupled to a passive optical network data source and a data output configured for connection to a data interface of a computer device.

In a further embodiment, a system includes a passive cable splitter and an ultra wideband adapter located at a customer premises. The passive cable splitter receives a video signal and a modulated ultra wideband data signal from a remotely-located ultra wideband adapter via a first cable. The video signal and the modulated ultra wideband data signal are output to a set-top box device via a second cable. The ultra wideband adapter located at the customer premises includes a combined signal interface to receive the video signal and the modulated ultra wideband data signal via a third cable. A demodulator extracts a data signal from the modulated ultra wideband data signal to generate a computer readable data signal. The computer readable data signal is output to a computing device via a data connection interface.

In another embodiment, an ultra wideband adapter includes a combined signal interface to receive a split signal from a passive cable splitter, where the split signal includes a video signal and a modulated ultra wideband data signal. A demodulator extracts a data signal from the modulated ultra wideband data signal of the split signal to generate a computer readable data signal. A data connection interface outputs the computer readable data signal to a computing device. An ultra wideband modulator modulates data received from the computing device via the data connection interface to generate second modulated ultra wideband data. The second modulated ultra wideband data is transmitted from the combined signal interface to another ultra wideband adapter via the passive cable splitter.

In another embodiment, a method includes receiving, at an ultra wideband adapter located at a customer premises, a split signal from a passive cable splitter located at the customer premises, where the split signal includes a video signal and a modulated ultra wideband data signal. The method includes extracting a data signal from the modulated ultra wideband data signal of the split signal to generate a computer readable data signal. The computer readable data signal is output to a computing device and data is received from the computing device. The data received from the computing device is modulated to generate second modulated ultra wideband data. The second modulated ultra wideband data is transmitted from the ultra wideband adapter located at the customer premises to another ultra wideband adapter that is remotely-located with respect to the customer premises via the passive cable splitter.

Referring to FIG. 1, a system for communicating data is disclosed. The system includes a passive optical network element 102, a first ultra wideband adapter 104, and a second ultra wideband (UWB) adapter 106. The system also includes existing coaxial cable 120 connected to the UWB adapter 104. The existing coaxial cable 120 is a communication medium for carrying video and data and is connected to a passive cable splitter 130. The passive cable splitter 130 connects to a first cable path 132 for connection to the UWB adapter 106 and to a second cable path 134 for connection to a far end set top box 108. The illustrated set top box 108 is coupled to a display device 110 such as a monitor or television. The second cable path 134 typically carries a video signal for display on the end user display 110. The second UWB adapter 106 includes a data connection interface that is coupled to an end user computer 112.

The first UWB adapter 104 includes a first input to receive a video signal from the passive optical network element 102 at interface 124. The first UWB adapter 104 also includes a second input to receive data produced by a data port 126 of the passive optic network element 102. The data path may be provided using an Ethernet type interface such as a 100 base T Ethernet connection 122. The passive optical network element 102 also includes an output for telephony signals. The telephony output may be an RJ 11 connection and may be connected over an existing twisted pair telephone line 136 to an end user telephone device. The passive optical network element 102 in a particular embodiment is an optical network terminal as shown in FIG. 1. The passive optical network (PON) element 102 is coupled to an optical communication signal 128 as shown.

During operation, optical communication signals 128 are received by the PON element 102. The PON element 102 provides a video signal at video output 124 and provides a data signal at data output 126. The video output and the data output are both connected to the first UWB adapter 104. The UWB adapter passes a video signal over the coaxial cable 120 and also provides an ultra wideband signal to carry data received from the PON 102. The data signal, after being converted to an ultra wideband signal, may be carried on the same coaxial cable 120 as the video signal without interference. The video and data signals are carried along coaxial cable 120 to the passive cable splitter 130. The data and video signals are carried to the second UWB adapter 106 where the data signal is filtered and detected from ultra wideband signal and converted to a baseband Ethernet data stream that is suitable for communication to the computer 112. The video and data signals are provided over the cable path 134 to set top box 108 where the video is displayed on a monitor or television as shown and the UWB data stream is seen as low level interface to the set top box 108. Thus, a personal computer user within a residence may have access to high-speed data carried along an existing coaxial cable supporting a multichannel video signal. The high-speed data may be provided over the same communication media as a video signal, which may be used by the end user for television display.

Data originating from a computer such as the illustrated personal computer 112 may be provided over a data interface to the ultra wideband adapter 106. The ultra wideband adapter 106 produces an ultra wideband signal, which is carried along cable path 132 and coaxial cable 120. The data is communicated via the ultra wideband signal to the first ultra wideband adapter 104 at a far end. The far end UWB adapter 104 converts the ultra wideband signal to the source data originally provided by computer 112. The data as converted at the UWB adapter 104 is provided over the Ethernet connection 122 to the data port 126 of the passive optical network element 102. Once at the passive optical network element 102, the received data may be further encoded and transmitted over the PON optical network via optical communication signals such as optical signal 128, as shown.

Thus, the UWB adapter 104, placed between the PON terminal 102, which is connected to data port 126 and to the existing coaxial cable which may be carried to a residence, injects data packets onto the coaxial cable that may be extracted at the computer 112 thru another UWB adapter, such as UWB adapter 106 as illustrated. Since data is injected via a UWB adapter, the resulting signal appears on the coaxial cable as an increased noise floor that is low enough to not interfere with video at the set top box 108 but is recoverable at UWB adapter 106.

UWB technology is low power and power may be provided to the UWB adapter 106 over the coaxial cable from the PON terminal 102. In a particular embodiment, the UWB adapter may be implemented as a UWB base band transceiver and is coupled to coaxial media.

While current UWB implementations are limited by certain FCC rules with regard to utilization of RF spectrum, since the disclosed method injects UWB signals onto a guided media, such as a coaxial cable, UWB FCC admission rules do not apply, thereby allowing a designer to use the full range of RF spectrum over coaxial cable to achieve large bandwidths, such as those above 100 megabits per second.

In addition, due to the large bandwidth provided by UWB technology, significant broadband data may be delivered over existing coaxial cable. Such implementation avoids the expense of requiring additional cabling such as placing category five (CAT 5) type cabling inside existing homes, apartments, or businesses. Installation and the inconvenience of installing new cabling to provide broadband data is thereby eliminated. In addition, with the disclosed implementation, the system supplies a 100 base T Ethernet data connection throughout an existing home or business and provides an application that moves PON technology closer to a customer installable system.

Figure 2:
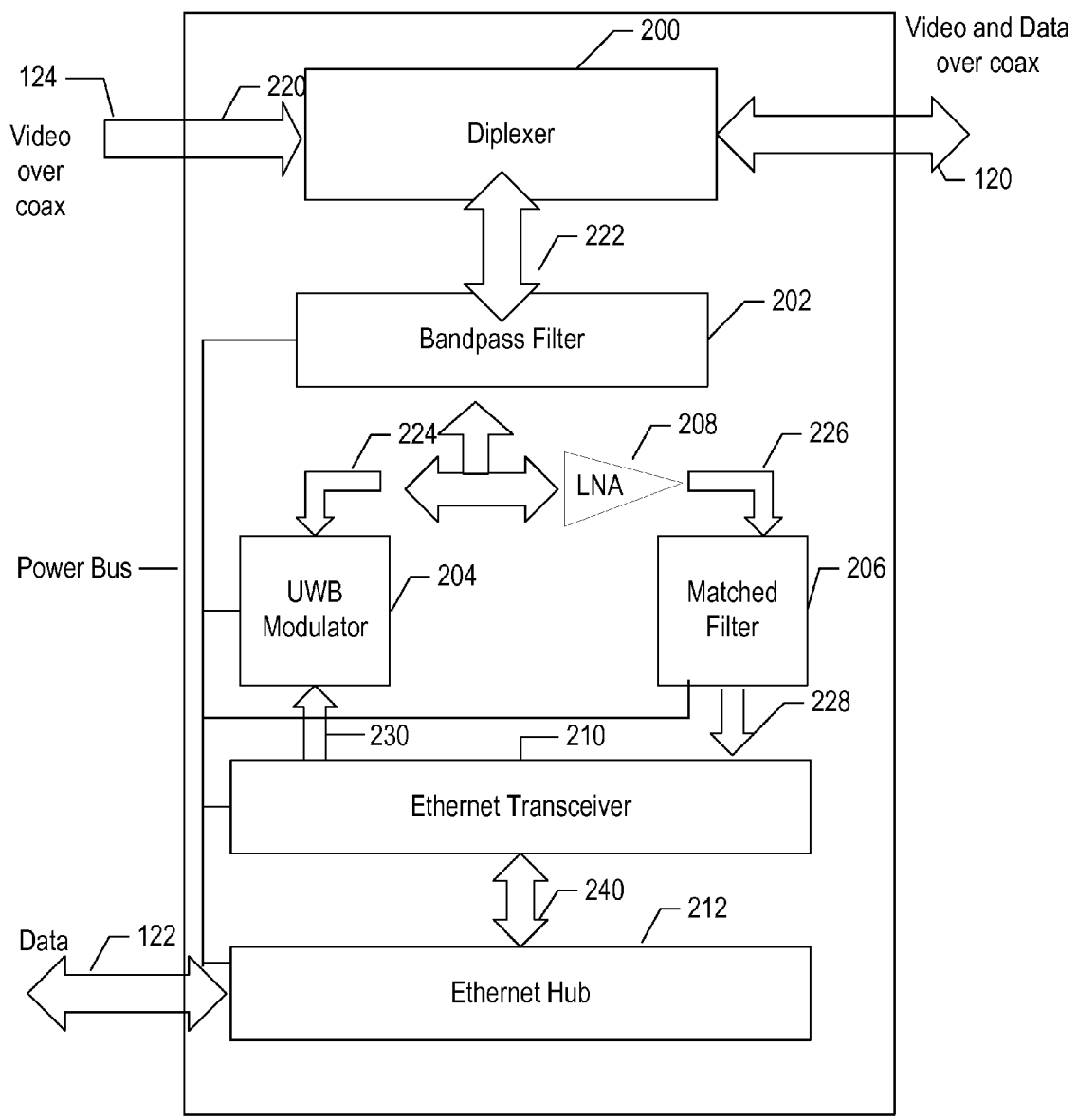
FIG. 2 is a block diagram of an illustrative ultra wideband adapter.

Referring to FIG. 2, a particular illustrative embodiment of a UWB adapter 104 is shown. The UWB adapter 104 has a video over coax input 124 and a video and data over coax output 120. The UWB adapter 104 also includes a data interface 122. The UWB adapter 104 as shown includes a diplexer 200, a bandpass filter 202, a UWB modulator 204, a matched filter 206, and an Ethernet transceiver 210. The UWB adapter 104 also includes an Ethernet hub 212 coupled to the Ethernet transceiver 210 via intermediate communication bus 240. The Ethernet hub 212 is coupled to the data interface 122 and serves the purpose of providing a passive Ethernet connection for test access if required. The Ethernet transceiver 210 has an output 230 to the UWB modulator 204 and has an input 228 responsive to match filter 206. The bandpass filter 202 is coupled to the diplexer 200 via communication bus 222. Bandpass filter 202 is coupled to the UWB modulator 204 via path 224 and is coupled to the matched filter 206 via path 226 and low noise amplifier 208. The low noise amplifier 208 receives a filtered signal from the bandpass filter 202 and provides an amplified version of the bandpass filtered signal 226 to the matched filter 206.

During operation, a video signal 124 is received at input 220 to diplexer 200. The video signal is passed to bandpass filter 202 and is amplified by the low noise amplifier (LNA) 208 and provided to the matched filter 206. A resulting match filter output 228 is provided to Ethernet transceiver 210. The Ethernet transceiver 210 provides an output 230 to UWB modulator 204. The UWB modulator 204 is also coupled to Ethernet hub 212 and bandpass filter 202. A resulting output signal in data form is provided at video and data output 120.

A data output signal is also provided at the data output 122 coupled to the Ethernet hub 212.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    a passive cable splitter located at a customer premises, the passive cable splitter comprising:
        a first interface to receive a video signal and a modulated ultra wideband data signal from a first ultra wideband adapter via a first cable, wherein the first ultra wideband adapter is remotely-located with respect to the customer premises;
        a second interface to output the video signal and the modulated ultra wideband data signal received at the first interface as a first split signal to a set-top box device via a second cable;
        a third interface to output the video signal and the modulated ultra wideband data signal received at the first interface as a second split signal via a third cable; and
    a second ultra wideband adapter located at the customer premises, the second ultra wideband adapter comprising:
        a combined signal interface to receive the second split signal from the passive cable splitter via the third cable;
        a demodulator to extract a data signal from the modulated ultra wideband data signal of the second split signal to generate a computer readable data signal; and
        a data connection interface to output the computer readable data signal to a computing device.

2. The system of claim 1, wherein the second ultra wideband adapter further comprises:
    an ultra wideband modulator to modulate data received from the computing device via the data connection interface to generate second modulated ultra wideband data,
    wherein the second modulated ultra wideband data is transmitted from the combined signal interface to the first ultra wideband adapter via the passive cable splitter.

3. The system of claim 1, wherein the first ultra wideband adapter comprises:
    a first input to receive video from a passive optical network element;
    a second input to receive data from the passive optical network element;
    an ultra wideband modulator to modulate the received data into the modulated ultra wideband data; and
    a diplexer to diplex the received video with the modulated ultra wideband data to provide a diplexed signal that includes the video signal and the modulated ultra wideband data signal.

4. The system of claim 3, wherein the first ultra wideband adapter further comprises a bandpass filter to bandpass-filter the received video.

5. The system of claim 4, wherein the first ultra wideband adapter further comprises an amplifier to amplify the bandpass-filtered video.

6. The system of claim 5, wherein the first ultra wideband adapter further comprises a matched filter to match-filter the amplified bandpass-filtered video.

7. The system of claim 3, wherein the ultra wideband adapter further comprises a transceiver to receive the data.

8. The system of claim 3, wherein the modulated ultra wideband data is part of a noise floor of the diplexed signal.

9. The system of claim 3, wherein the modulated ultra wideband data is position or amplitude modulated across a range of spectra extending from 1 GHz to 10 GHz.

10. The system of claim 1, wherein the set-top box device displays video of the video signal via a display device without interference from the modulated ultra wideband data signal.

11. An ultra wideband adapter comprising:
    a combined signal interface to receive a split signal from a passive cable splitter, wherein the split signal includes a video signal and a modulated ultra wideband data signal;
    a demodulator to extract a data signal from the modulated ultra wideband data signal of the split signal to generate a computer readable data signal;
    a data connection interface to output the computer readable data signal to a computing device; and
    an ultra wideband modulator to modulate data received from the computing device via the data connection interface to generate second modulated ultra wideband data, and to transmit
    the second modulated ultra wideband data from the combined signal interface to another ultra wideband adapter via the passive cable splitter.

12. The ultra wideband adapter of claim 11, wherein the second modulated ultra wideband data is position or amplitude modulated across a range of spectra extending from 1 GHz to 10 GHz.

13. The ultra wideband adapter of claim 11, wherein the data connection interface includes an Ethernet interface.

14. The ultra wideband adapter of claim 11, wherein the combined signal interface includes a coaxial cable interface.

15. A method comprising:
    receiving, at an ultra wideband adapter located at a customer premises, a split signal from a passive cable splitter located at the customer premises, wherein the split signal includes a video signal and a modulated ultra wideband data signal;
    extracting a data signal from the modulated ultra wideband data signal of the split signal to generate a computer readable data signal;
    outputting the computer readable data signal to a computing device;
    receiving data from the computing device;
    modulating the data received from the computing device to generate second modulated ultra wideband data; and
    transmitting the second modulated ultra wideband data from the ultra wideband adapter located at the customer premises to another ultra wideband adapter that is remotely-located with respect to the customer premises via the passive cable splitter.

16. The method of claim 15, wherein the second modulated ultra wideband data is position or amplitude modulated across a range of spectra extending from 1 GHz to 10 GHz.

17. The method of claim 15, wherein the computer readable data signal is output from the ultra wideband adapter to the computing device via an Ethernet interface, and wherein the data received from the computing device is received at the ultra wideband adapter via the Ethernet interface.

18. The method of claim 15, wherein the split signal is received at the ultra wideband adapter from the passive cable splitter via a coaxial cable interface, and wherein the second modulated ultra wideband data is transmitted from the ultra wideband adapter via the coaxial cable interface.

19. The method of claim 15, wherein the second modulated ultra wideband data is demodulated at the ultra wideband adapter that is remotely-located with respect to the customer premises to generate demodulated data.

20. The method of claim 19, wherein the demodulated data is communicated via a passive optical network element.

* * * * *